United States Patent
Mazaheri et al.

(10) Patent No.: US 12,480,375 B2
(45) Date of Patent: Nov. 25, 2025

(54) COUPLING FOR MAKING SUBSEA CONNECTIONS AND METHOD FOR USE THEREOF

(71) Applicant: Chevron Australia Pty Ltd., Perth (AU)

(72) Inventors: Alireza Mazaheri, Cottesloe (AU); Farhad Rezvaninejad, Applecross (AU)

(73) Assignees: Chevron Australia Pty Ltd., Perth (AU); Chevron U.S.A. Inc., San Ramon, CA (US)

( * ) Notice: Subject to any disclaimer, the term of this patent is extended or adjusted under 35 U.S.C. 154(b) by 796 days.

(21) Appl. No.: 16/688,921

(22) Filed: Nov. 19, 2019

(65) Prior Publication Data

US 2021/0148181 A1    May 20, 2021

(51) Int. Cl.
| | | |
|---|---|---|
| *E21B 33/038* | (2006.01) | |
| *E21B 43/013* | (2006.01) | |
| *F16L 1/26* | (2006.01) | |
| *G01M 3/08* | (2006.01) | |
| *E21B 33/035* | (2006.01) | |

(52) U.S. Cl.
CPC .............. *E21B 33/038* (2013.01); *F16L 1/26* (2013.01); *E21B 33/0355* (2013.01); *E21B 43/013* (2013.01)

(58) Field of Classification Search
CPC .. E21B 33/038; E21B 33/0355; E21B 43/013; G01M 3/08; F16L 1/26
USPC ...................................................... 251/149.3
See application file for complete search history.

(56) References Cited

U.S. PATENT DOCUMENTS

| | | | | |
|---|---|---|---|---|
| 3,141,684 A | * | 7/1964 | Haber ................... | B42D 5/022 462/17 |
| 3,141,685 A | * | 7/1964 | Watts ................... | F16L 23/167 277/625 |
| 3,220,245 A | * | 11/1965 | Van Winkle ......... | E21B 33/038 285/364 |

(Continued)

OTHER PUBLICATIONS

"Automatic Sealing Connectors from TQC Ltd."; http://www.leaktesting.co.uk/nolek_auto_connectors.htm, downloaded on Nov. 22, 2019, 1 page.

(Continued)

*Primary Examiner* — Nicole Coy
*Assistant Examiner* — Douglas S Wood
(74) *Attorney, Agent, or Firm* — Avery L. Cate

(57) ABSTRACT

A coupling is disclosed for making subsea connections that mates with an interlocking coupling. The surface of the end of the coupling that mates with the interlocking coupling includes a recess and a groove. A primary seal is provided for fitting into the recess and a metal seal is provided for fitting into the groove. The coupling body includes a primary test port passage between the space external to the coupling and a location along the surface adjacent the recess, and a secondary test port passage between the space external to the coupling and a location along the surface radially between the recess and the groove. A method for installing a subsea pipeline or riser system is disclosed that utilizes the coupling and the interlocking coupling. The method allows for the elimination of the conventional practice of flooding, hydrotesting and dewatering.

14 Claims, 6 Drawing Sheets

(56) References Cited

U.S. PATENT DOCUMENTS

| | | | | |
|---|---|---|---|---|
| 4,019,371 | A * | 4/1977 | Chaplin | F16L 23/167 73/49.8 |
| 5,072,622 | A * | 12/1991 | Roach | F16L 58/1036 73/40.5 R |
| 6,299,216 | B1 * | 10/2001 | Thompson | F16L 23/167 277/318 |
| 7,107,662 | B1 * | 9/2006 | Levario | F16L 23/167 285/55 |
| 7,226,089 | B2 * | 6/2007 | Wilkinson, III | F16L 23/032 285/123.1 |
| 7,942,452 | B2 * | 5/2011 | Carns | G01M 3/283 285/123.1 |
| 7,942,542 | B1 * | 5/2011 | Dunn | G09F 13/16 362/604 |
| 8,261,596 | B2 * | 9/2012 | Harrison | G01M 3/28 73/49.8 |
| 8,393,649 | B2 * | 3/2013 | Kitaguchi | F16L 23/167 285/368 |
| 9,488,302 | B2 * | 11/2016 | Gjerstad | F16L 23/18 |
| 10,422,456 | B2 * | 9/2019 | Askestad | F16L 23/18 |
| 11,035,509 | B2 * | 6/2021 | Irvine | F16J 15/08 |
| 2010/0018693 | A1 * | 1/2010 | Duncan | E21B 37/00 166/384 |
| 2010/0019683 | A1 * | 1/2010 | Otte | H05B 41/2888 315/246 |
| 2017/0307462 | A1 * | 10/2017 | Barron | E21B 41/0007 |

OTHER PUBLICATIONS

"North Sea Platform Wellhead 7", 9-5/8" & 13-3/8" Isolation"; Kinetics Controls & Innovation Ltd., downloaded on Nov. 22, 2019, 6 pages.

"Successful DHSV Line Isolation on a UK Subsea Wellhead Using Mac-Seal"; Mac-Seal Leak Sealing Solution, Kinetics Controls & Innovation Ltd., www.kciltd.co.uk, downloaded on Nov. 22, 2019, 3 pages.

"TPC Compact Flanges"; https://www.tpconnectors.com/tpc-compact-flanges, downloaded on Nov. 22, 2019, 9 pages.

* cited by examiner

COUPLING FOR MAKING SUBSEA CONNECTIONS AND METHOD FOR USE THEREOF

FIELD

The present disclosure relates generally to the field of subsea couplings. The present disclosure further relates generally to methods for installing subsea pipeline and/or riser systems.

BACKGROUND

According to standard industry practice for installing and commissioning subsea pipeline and risers, referring to FIG. 1, the pipeline 2 is laid from a pipe laying vessel onto the seabed 1 with the pipeline empty (dry). The pipeline 2 is connected to pipeline end terminations (PLETs) 5 at either end. The pipeline 2 is then typically flooded with large volumes of water containing a corrosion inhibitor to check for leaks and a hydrotest is performed to test the strength of the welds in the pipeline. Spools 4 are installed connecting the ends of the pipeline system. e.g., pipeline end terminations (PLETs) 5, to a manifold 6 or other subsea structure at each end. The water is then removed, also referred to as dewatering. Often for large bore pipeline, the pipeline is not isolated until it reaches a manifold. Therefore there are significant volumes of treated water required for flooding followed by significant dewatering campaigns. The hydrotest and dewatering operations include complicated procedures involving valve manipulations, pressure delivery equipment, pressure and temperature monitoring systems, and extensive drying and/or nitrogen dewatering processes.

The standard practice is time-consuming and expensive, particularly to ensure that the pipeline system is thoroughly dry to avoid corrosion. In projects having greater than 100 km long pipelines, drying can take months of time with the inherent corrosion risk associated with incomplete drying.

It would be highly desirable to have a way to ensure leak tight subsea connections without the need for a complete system hydrotest including flooding and dewatering.

SUMMARY

In general, in one aspect, the disclosure relates to a coupling for making subsea connections that includes a coupling body having a first end for mating with an interlocking coupling, a second end for joining to a first structure, and a bore therethrough. The first end has a surface profile varying along the distance from a centerline of the bore for contacting a mating surface of the interlocking coupling. The first end surface has a recess and a groove at a location radially outward from the recess such that the first end surface contacts the mating surface of the interlocking coupling radially between the recess and the groove. A primary seal is provided for fitting into the recess between the first end surface and the mating surface of the interlocking coupling. A metal seal is provided for fitting into the groove between the first end surface and the mating surface of the interlocking coupling. The coupling body further includes a primary test port passage providing fluid connection between a space external to the coupling and a location along the first end surface adjacent the recess, and a secondary test port passage providing fluid connection between a space external to the coupling and a location along the first end surface radially between the recess and the groove.

In another aspect, the disclosure can generally relate to a method for installing a subsea pipeline or riser system. The method includes positioning the coupling body joined to a first segment of a subsea pipeline or a first segment of a riser at a desired location on a seabed near a second segment of a subsea pipeline or riser. The first segment of subsea pipeline or riser has a plug therein for preventing ingress of water. The interlocking coupling is positioned on the seabed between the coupling body and the second segment of subsea pipeline or riser. The first end of the interlocking coupling is connected to the first end of the coupling body, and the second end of the interlocking coupling is connected to the second segment of subsea pipeline or riser.

BRIEF DESCRIPTION OF THE DRAWINGS

These and other objects, features and advantages of the present invention will become better understood with reference to the following description, appended claims and accompanying drawings. The drawings are not considered limiting of the scope of the appended claims. Reference numerals designate like or corresponding, but not necessarily identical, elements. The drawings illustrate only example embodiments. The elements and features shown in the drawings are not necessarily to scale, emphasis instead being placed upon clearly illustrating the principles of the example embodiments. Additionally, certain dimensions or positionings may be exaggerated to help visually convey such principles.

DETAILED DESCRIPTION

Figure 1:
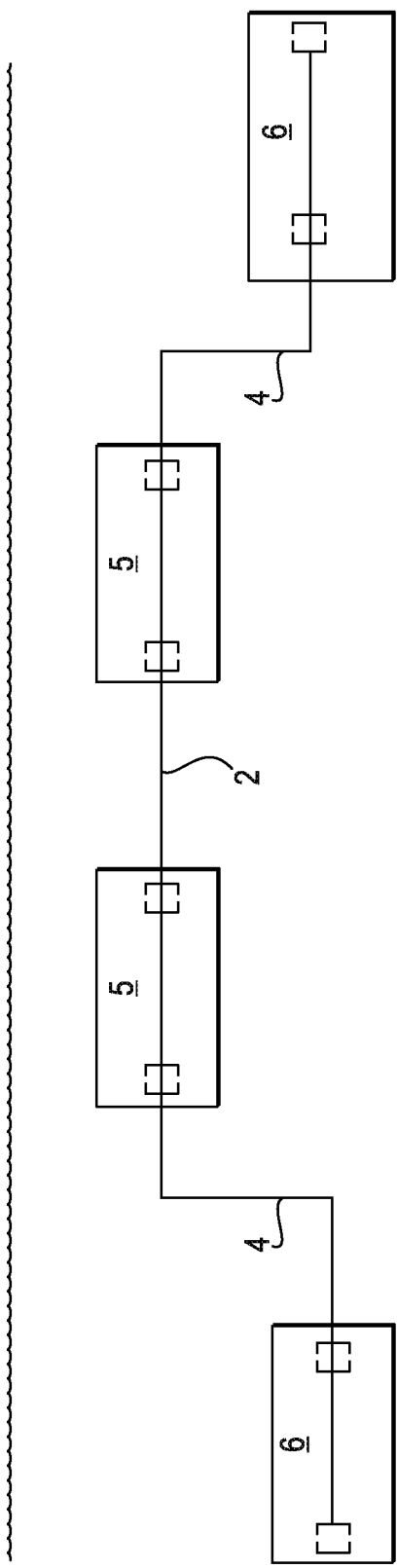
FIG. 1 shows a schematic diagram of a subsea field site illustrating a prior art method for installing and commissioning subsea pipeline.
Figure 2:
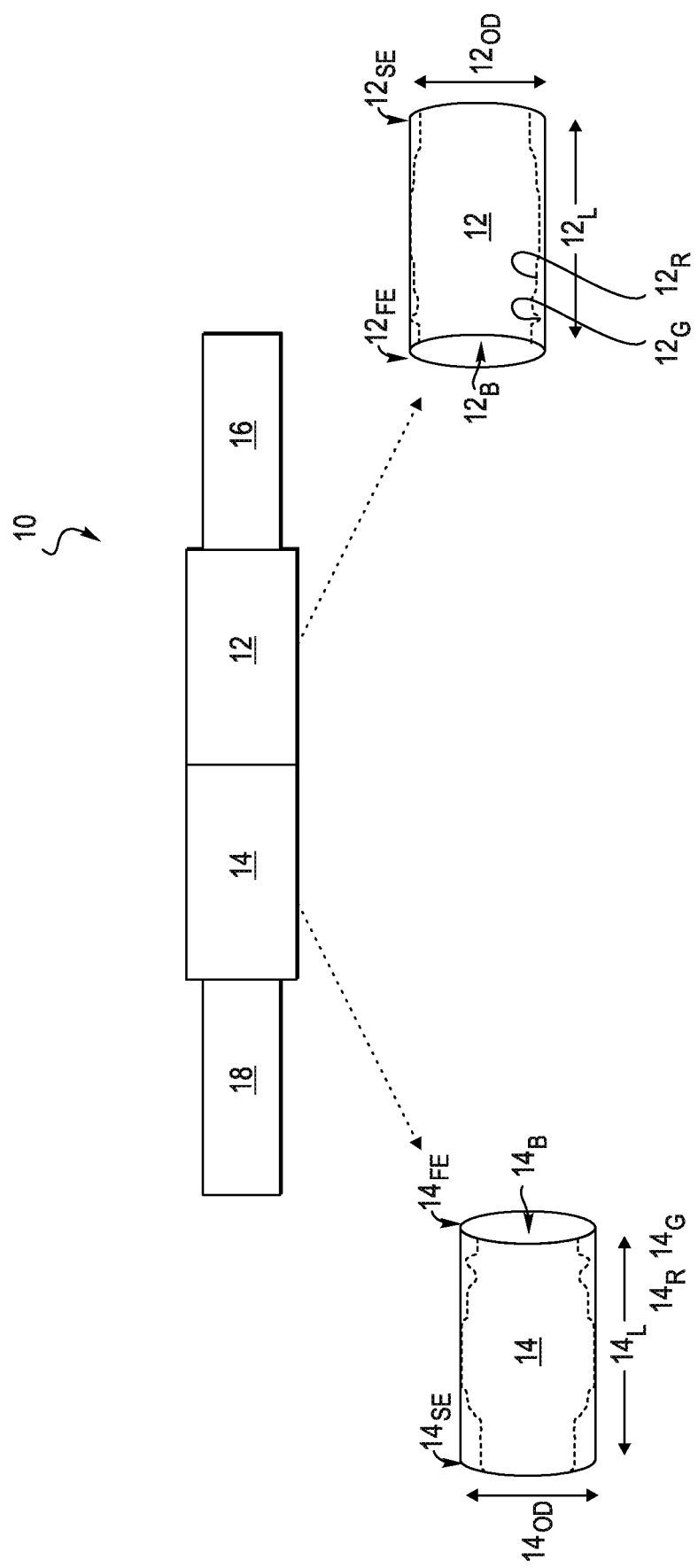
FIG. 2 shows a simplified view of a subsea connection including a coupling body and an interlocking coupling according to an embodiment.
Figure 3C:
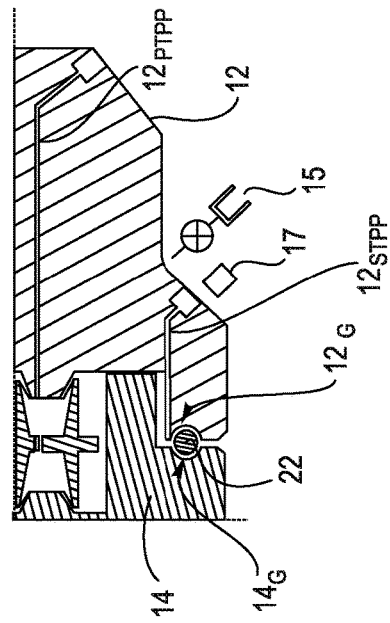
FIGS. 3A-3C show various views of the subsea connection according to one embodiment.
Figure 3B:
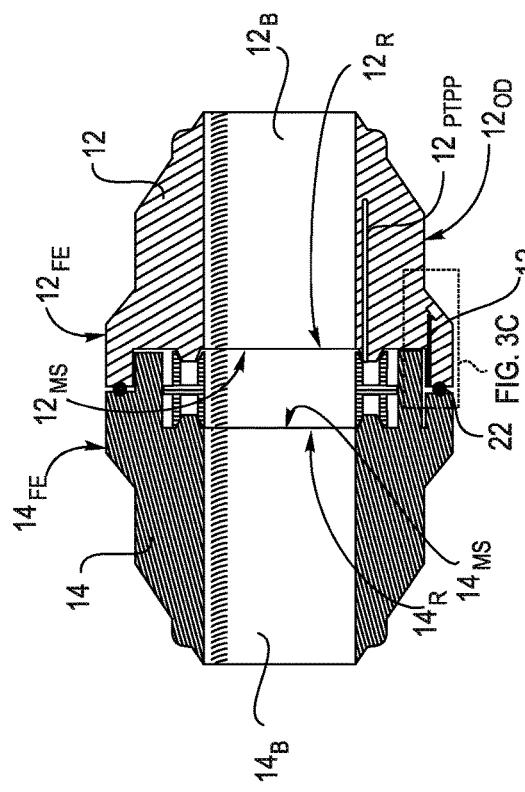
Figure 3A:
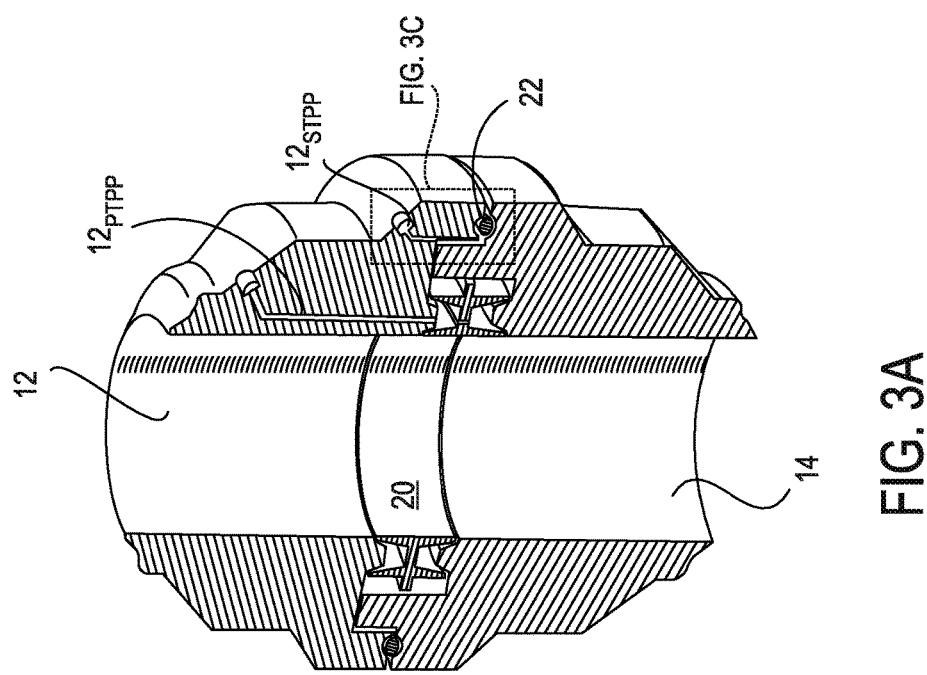

Referring to FIG. 2, a simplified view of a subsea connection 10 utilizing a coupling 12 that includes dual sealing (primary and secondary) barriers, as will be described hereinafter, is shown. In one embodiment, a coupling 12 for use in making such subsea connections 10 is provided. The coupling 12 has a coupling body having a length $12_L$, a bore $12_B$ therethrough, a first end $12_{FE}$ having a mating surface for mating with an interlocking coupling 14 that interlocks with the coupling body 12, and a second end $12_{SE}$ for joining to a subsea structure 16. In one embodiment, the second end of the coupling $12_{SE}$ joins to the subsea structure 16 by welding. Likewise, the interlocking coupling 14 joins to a subsea structure 18. The interior of the first end $12_{FE}$ has a recess $12_R$ therein, and a groove $12_G$ therein.

Referring to FIGS. 3A-3C and FIGS. 4A and 4B, according to one embodiment, the first end $12_{FE}$ of the coupling 12 has a mating surface $12_{MS}$ for mating with the interlocking coupling 14. The first end $12_{FE}$ has a surface profile that varies along a radial distance from the centerline of the bore $12_B$ for contacting a mating surface $14_{MS}$ of the interlocking coupling 14. In some embodiments, the coupling 12 has an outer diameter profile $12_{OD}$ that varies along the length of the body 12. In some embodiments, as shown, the groove $12_G$ is at a location radially outward from the recess $12_R$ such that the first end surface $12_{FE}$ contacts the mating surface $14_{MS}$ of the interlocking coupling 14 radially between the recess $12_R$ and the groove $12_G$. A primary seal 20 fits into the recess $12_R$ between the first end 12F surface and the mating surface $14_{MS}$ of the interlocking coupling 14. A metal seal 22 fits into the groove $12_G$ between the first end 12F surface and the mating surface $14_{MS}$ of the interlocking coupling 14. There can be contact between the first end 12F surface of the coupling 12 and the mating surface $14_{MS}$ of the interlocking coupling 14 radially between the recess $12_R$ and the groove $12_G$ inward from the metal seal 22. In one embodiment, the seals 20 and 22 can be formed of a high strength material such as a Corrosion Resistant Alloy (CRA) such as Inconel 718.

Figure 4B:
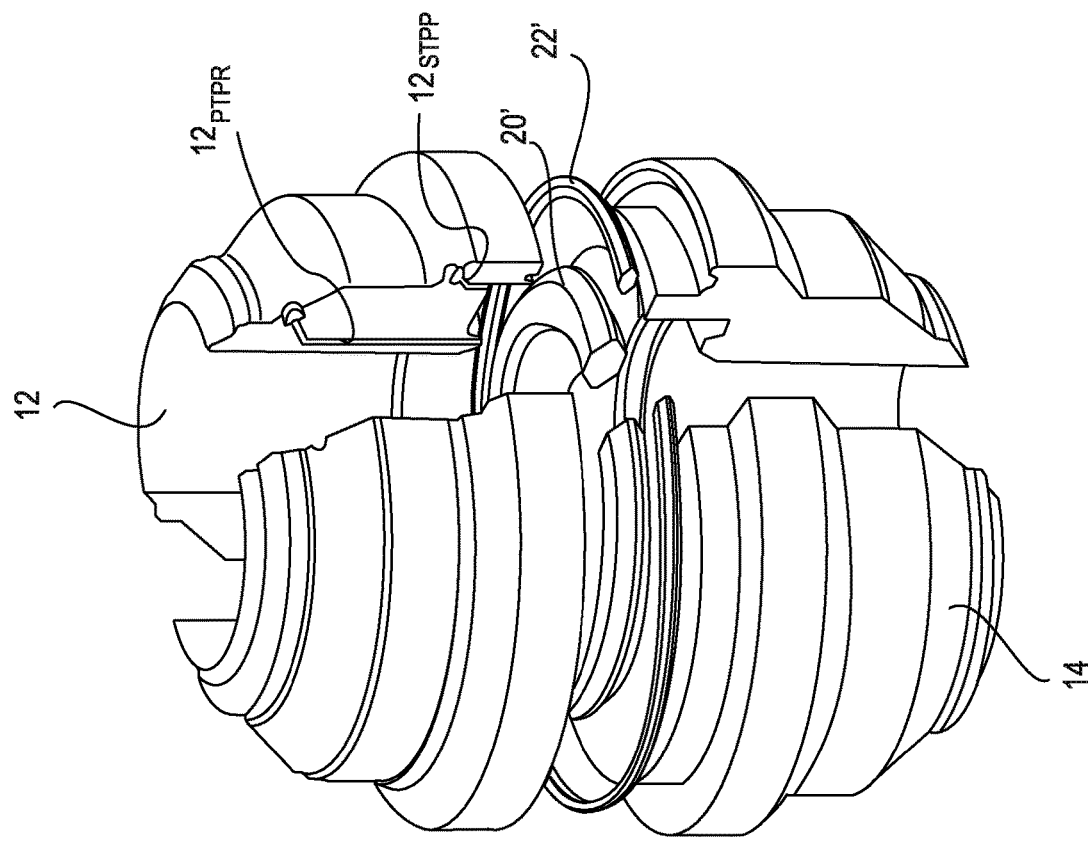
FIGS. 4A and 4B show an exploded view of the subsea connection.
Figure 4A:
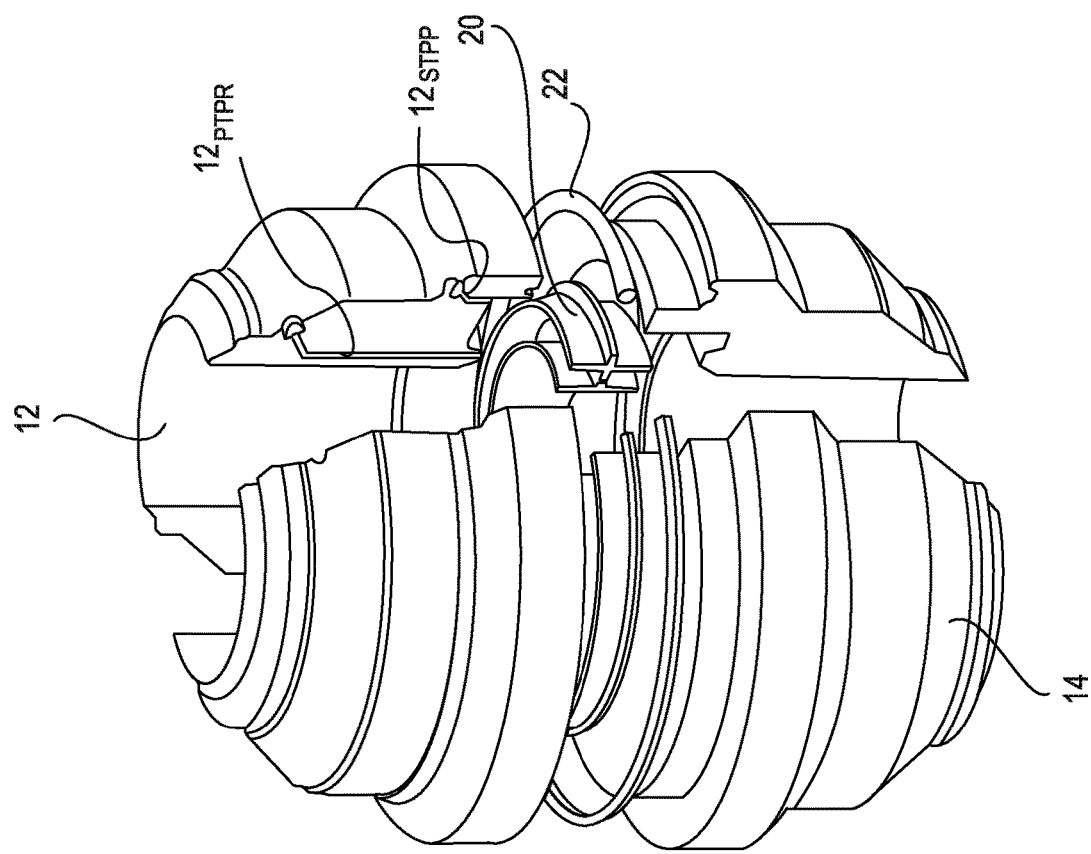

The shapes of the seals 20 and 22 are not critical and can vary. FIGS. 4A and 4B show alternative suitable shapes, for example.

The coupling body 12 includes a primary test port passage $12_{PTPP}$ providing fluid connection between the space external to and surrounding the coupling 12 and a location along the first end $12_{FE}$ surface adjacent the recess $12_R$. The coupling body 12 also includes a secondary test port passage $12_{STPP}$ providing fluid connection between the space external to and surrounding the coupling 12 and a location along the first end $12_{FE}$ surface radially between the recess $12_R$ and the groove $12_G$.

In one embodiment, referring again to FIG. 2, the interlocking coupling 14 has an interlocking coupling body having a length $14_L$, a bore $14_B$ therethrough, an outer diameter profile $14_{OD}$ varying as shown along the length $14_L$, a first end $14_{FE}$ for mating with the coupling body 12, and a second end $14_{SE}$ for joining to another subsea structure 18. The first end 14F has a first end 14F surface profile for contacting the mating surface $12_{MS}$ of the coupling body 12. The first end $14_{FE}$ surface has a recess $14_R$ therein and a groove 14 therein.

Figure 5:
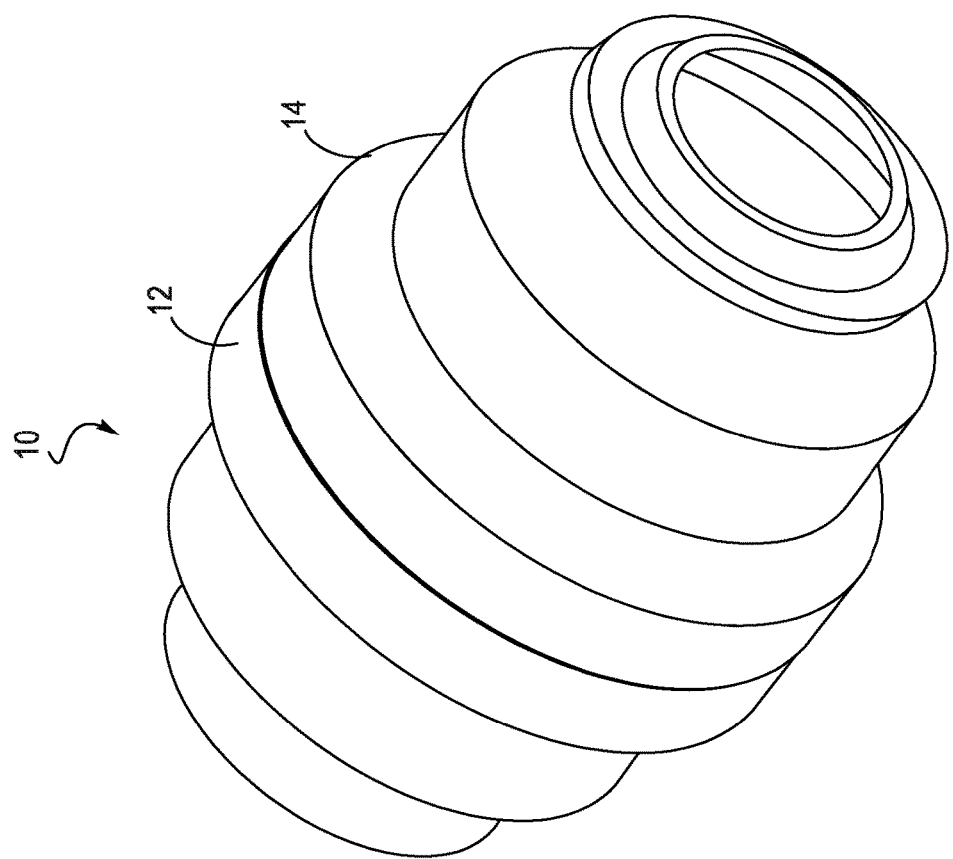
FIG. 5 shows a perspective view of the subsea connection.

In one embodiment, the coupling 12 includes a valve and a hot stab receptacle assembly 15 that is normally occupied by a high pressure cap 17 connected to the secondary test port passage $12_{STPP}$ for allowing pressure testing of the subsea connection 10 by exposing the primary seal 20 and the metal seal 22 to a full leak test pressure. This provides the ability to fully test both internal and external seals against the full leak test pressures. This will enable robust assurances that the subsea connection 10 has been made securely and is safe for hydrocarbon flow. FIG. 5 is a perspective view of the subsea connection 10 illustrating the subsea connection 10 having been made securely, according to one embodiment.

In one embodiment, one or both of the subsea structures 16 and 18 is a segment (also referred to as an end segment) of a subsea pipeline or an end segment of a riser. In one embodiment, one or both of the subsea structures 16 and 18 is a fitting of a subsea pipeline end termination (PLET) or a subsea manifold. In one embodiment, the bore of the subsea structure 16 and/or 18 can be from about 4 to about 42 inches in diameter.

Figure 6:
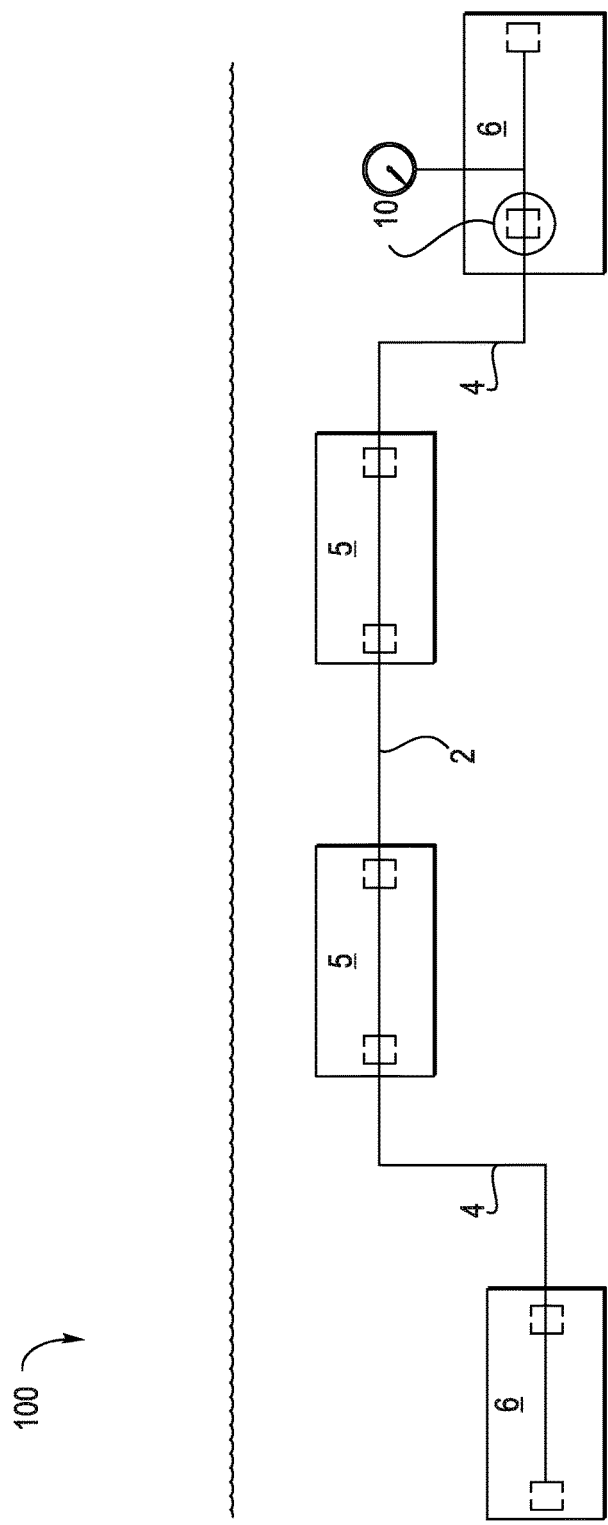
FIG. 6 shows a schematic diagram of a subsea field site illustrating system and methods according to embodiments.

In one embodiment, referring to FIG. 6, a subsea pipeline system 100 is provided that includes subsea pipeline segments connected to one another by at least one subsea connection 10 using the coupling 12. The system 100 can include pipeline segments and/or riser segments connected to one another using the subsea connections 10 using the coupling 12. In each subsea connection 10, the coupling 12 and the interlocking coupling 14 are joined to a segment of a subsea pipeline or a segment of a riser.

In one embodiment, referring to FIG. 6, the ends of the pipeline 2 are connected to PLETs 5 which in turn are connected to spools 4, in turn connected to manifolds 6. The subsea connection 10 disclosed herein can be used with the pipeline 2 and the spool 4 (segments). All of the connections between the ends of a pipeline or spool are welded to the PLET or manifold. Using this arrangement, a conventional pig launcher can be eliminated from the system 100 as this eliminates the need to flood or dewater the pipeline 2.

In one embodiment, a method for installing a subsea pipeline or riser system uses the coupling 12 and the interlocking coupling 14 described herein. The second end $12_{SE}$ of the coupling body 12 is joined to the subsea structure 16 which is in this case a segment of a subsea pipeline (or a segment of a riser). The pipeline segment has a plug therein, also referred to as a low pressure plug, for preventing ingress of water during the installation method. The subsea pipeline segment is positioned (laid) at the desired location on the seabed near another (second) segment of subsea pipeline (or riser). The coupling body 12 joined to the subsea pipeline segment is landed on the seabed. The interlocking coupling 14 is positioned on the seabed between the coupling body 12 and the second segment of subsea pipeline (or riser). The first end $14_{FE}$ of the interlocking coupling 14 is connected to the first end $12_{FE}$ of the coupling body 12. The second end $14_{SE}$ of the interlocking coupling 14 is connected to the second subsea structure 18 which is in this case a segment of a subsea pipeline (or a segment of a riser). The method can alternatively be used to connect the coupling 12 and interlocking coupling 14 to other structures (16, 18) aside from pipeline or riser, such as, but not limited to, a fitting of a subsea pipeline end termination (PLET) or a fitting of a subsea manifold (not shown).

In one embodiment, the system 100 can then be pressure tested by exposing the primary seal 20 and the metal seal 22 to a full leak test pressure (e.g., nominally 1.25× design pressure) using the valve 15 after removing the high pressure cap 17 connected to the secondary test port passage 12STPP of the coupling 12. The subsea connection 10 allows the primary barrier to be tested to design pressures using a remotely operated vehicle (ROV) so that the seal 22 is tested in a more conservative direction than in typical pressure testing. In other words, known seals are normally designed for pressure testing from the interior of the coupling, whereas in this case pressure testing is done from the exterior by the holding the full leak pressure against the primary and secondary seal. The seal is tested in this direction during qualification as well for completeness. Thus the subsea connections 10 can simply be pressure tested using an ROV. This is very advantageous as contrasted with conventional practice of pressure testing the entire pipeline requiring a full complement of equipment and days of operation. The system 100 can be pressure tested using milliliters of fluid that an ROV can supply on its own. In some embodiments, the ROV can be outfitted with additional minor equipment such as an ROV backpack with a hot stab to deliver higher pressure fluid for the pressure check. Performing stress analysis combined with qualification according to API 6A/17D can be used to confirm that the external pressure is conservative for radially stressed seals for the disclosed subsea connection. ROV's typically have 207 bar delivery which can be upgraded to a high pressure unit, low-volume application. In one nonlimiting example, the delivery mechanism can be a standard 4L17D hot stab that is rated to 690 bar.

In one embodiment, the plug can then be removed from the first segment of subsea pipeline (or other structure 16) by applying pressure from the second structure (second segment of subsea pipeline or other structure 18) to the plug such that the plug dislodges from the first segment of subsea pipeline (or other structure 16) and can be retrieved at a far end of the first segment of subsea pipeline (or other structure 16). The plug can be retrieved by a pig receiver at the far end of the first segment of subsea pipeline (or other structure 16). A small amount of inhibited seawater can also be removed along with the plug.

In one embodiment, the method further includes completing a precommissioning sequence of the installed subsea pipeline system 100 in which no flooding of the subsea pipeline (or riser) system 100 is conducted as it is not needed with the disclosed method. In turn, no extensive, time-consuming dewatering is required. Thus, the precommissioning sequence is greatly simplified. At this point, the system 100 can be started up such that the produced fluids flow in the installed system with no further precommissioning steps.

The pre-commissioning sequence for a riser system is similar to a pipeline system. The riser is laid including the internal plug on the seabed as similar for laying pipeline. The riser is lifted onto a floating structure such as a pontoon. The disclosed system and method enable larger diameter risers and deeper water as they allow the line to be kept free of water which decreases the riser weight significantly. The technology is used on the two ends of the riser as with the pipeline, one end on the seabed where it will be connected to a PLET or manifold and the other end on the top of the pontoon where it will be connected to a closing spool.

The subsea connection is made and broken using a removable stroking tool as known to those of ordinary skill that brings the coupling 12 and the interlocking coupling 14 together with the seals 20 and 22 inserted, so that a torque tool can be used for completing the mechanical connection process.

The disclosed apparatus, systems and methods provide many advantages over conventional practice. The disclosed apparatus, systems and methods provide a way to eliminate the conventional practice of flooding, hydrotesting and dewatering, with the associated use of blocking pigs, and thus significantly reduce costs during installation of subsea systems. For example, for systems with pipelines connecting to spools where there are no intermediate valves, this arrangement will facilitate significant cost and schedule savings. Further advantages include a reduction in offshore construction time and potential issues surrounding the use of coiled tubing downlines; instant confirmation or verification of spool connections in addition to verification of weld integrity; an alternative practice when flooding is not a viable option; and elimination of the need to pressure test against ball valves. The disclosed apparatus, systems and methods can be used in any subsea greenfield and brownfield projects where there are significant pre-commissioning costs (vessel costs and/or downline). Use of the disclosed systems and methods reduces risk of corrosion due to potential poor drying operations.

When the disclosed apparatus, systems and methods are used to install a riser system, the benefits are also include the significant benefit of not having to push out water to topside environment around personnel.

It should be noted that only the components relevant to the disclosure are shown in the figures, and that many other components normally part of a subsea pipeline or riser system are not shown for simplicity.

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

What is claimed is:

1. A subsea connection, comprising:
  a. a coupling comprising a coupling body having a length, a first end mated with an interlocking coupling, a second end joined to a first structure, and a bore therethrough;
     wherein the first end comprises a first end surface profile varying along a radial distance from a centerline of the bore and contacting a mating surface of the interlocking coupling, the first end surface having a recess therein and having a groove therein at a location radially outward from the recess such that the first end surface contacts the mating surface of the interlocking coupling radially between the recess and the groove, wherein the recess is larger than the groove;
  b. a primary seal fitted into the recess between the first end surface and the mating surface of the interlocking coupling; and
  c. a metal seal fitted into the groove between the first end surface and the mating surface of the interlocking coupling, wherein the primary seal is larger than the metal seal;
     wherein the coupling body further comprises a primary test port passage providing fluid connection between a space external to the subsea connection and the recess, wherein the primary test port passage intersects the recess; and a secondary test port passage providing fluid connection between a space external to the subsea connection and a location along the first end surface radially between the recess and the groove.

2. The subsea connection of claim 1 further comprising a valve and a hot stab receptacle connected to the secondary test port passage, wherein the hot stab receptacle is configured to receive a hot stab of a remote operated vehicle (ROV) for allowing pressure testing of the subsea connection by exposing the primary seal and the metal seal to a full leak test pressure.

3. The subsea connection of claim 1 wherein the first structure is an end segment of a subsea pipeline or an end segment of a riser.

4. The subsea connection of claim 1 wherein the first structure is a fitting of a subsea pipeline end termination (PLET) or a subsea manifold.

5. The subsea connection of claim 1 wherein the second end is joined to the first structure by welding.

6. The subsea connection of claim 1 wherein the interlocking coupling comprises an interlocking coupling body having a length, a first end mated with the coupling body, a second end joined to a second structure, and a bore therethrough; wherein the first end comprises a first end surface profile varying along a radial distance from a centerline of the bore and contacting a mating surface of the coupling body, the first end surface having a recess therein and having a groove therein at a location radially outward from the recess, wherein the recess is larger than the groove.

7. The subsea connection of claim 6 wherein the second structure is an end segment of a subsea pipeline or an end segment of a riser.

8. The subsea connection of claim 6 wherein the second structure is a fitting of a subsea pipeline end termination (PLET) or a subsea manifold.

9. A subsea pipeline or riser system, comprising a plurality of subsea pipeline and/or a plurality of riser segments connected to one another via the subsea connector of claim 6 wherein each of the coupling and the interlocking coupling are joined to a segment of a subsea pipeline or a segment of a riser.

10. A method for installing a subsea pipeline or riser system, comprising:
   a. providing the coupling of claim 6, wherein the second end of the coupling body is joined to the first structure wherein the first structure is a first segment of a subsea pipeline or a first segment of a riser and the first structure comprises a plug therein for preventing ingress of water;
   b. positioning the coupling body joined to the first structure at a desired location on a seabed near a second structure comprising a second segment of a subsea pipeline or a second segment of a riser;
   c. positioning the interlocking coupling on the seabed between the coupling body and the second structure;
   d. connecting the first end of the interlocking coupling to the first end of the coupling body and the second end of the interlocking coupling to the second structure; and
   e. completing precommissioning of the installed subsea pipeline or riser system whereby no flooding of the subsea pipeline or riser system is conducted.

11. The method of claim 10 further comprising pressure testing the subsea pipeline or riser system by exposing the primary seal and the metal seal to a full leak test pressure using a valve and a hot stab receptacle connected to the secondary test port passage of the coupling, wherein the hot stab receptacle is configured to receive a hot stab of a remote operated vehicle (ROV).

12. The method of claim 10 further comprising removing the plug from the first structure by applying pressure from the second structure to the plug such that the plug dislodges from the first structure and can be retrieved at a far end of the first structure.

13. The method of claim 12 wherein the plug is retrieved by a pig receiver at the far end of the first structure.

14. The method of claim 10 further comprising starting flow of produced fluids in the installed subsea pipeline or riser system with no further precommissioning of the subsea pipeline or riser system.

* * * * *